United States Patent [19]

Wakayama et al.

[11] Patent Number: 5,214,748
[45] Date of Patent: May 25, 1993

[54] ROBOT TEACHING/PLAYBACK SYSTEM

[75] Inventors: Hiromu Wakayama; Hideki Hashimoto, both of Kobe, Japan

[73] Assignee: Kabushiki Kaisha Kobe Seiko Sho, Kobe, Japan

[21] Appl. No.: 662,433

[22] Filed: Feb. 28, 1991

[30] Foreign Application Priority Data

May 22, 1990 [JP] Japan ................... 2-131498

[51] Int. Cl.$^5$ ............... G06F 15/46; G05B 19/42
[52] U.S. Cl. .......................... 395/82; 395/87; 901/6
[58] Field of Search .............. 395/82, 87; 901/6

[56] References Cited

U.S. PATENT DOCUMENTS

| | | | |
|---|---|---|---|
| 4,541,062 | 9/1985 | Kada et al. | 395/82 |
| 4,807,152 | 2/1989 | Lane et al. | 395/82 |
| 4,831,547 | 5/1989 | Ishiguro et al. | 395/82 |
| 4,836,742 | 6/1989 | Ishiguro et al. | 395/82 |

*Primary Examiner*—Allen R. MacDonald
*Attorney, Agent, or Firm*—Oblon, Spivak, McClelland, Maier & Neustadt

[57] ABSTRACT

A robot teaching/playback system for controlling a robot which performs an operation on a work turned by a turntable and also controls the turntable, including a common controlling means for controlling the turntable and robot, teaching means for storing in a memory a set of robot working data and taught turntable rotational position data for each of divisional rotational regions into which the turntable is divided, and playback means for interpolating robot working data and turntable rotational position data between each adjacent ones of the divisional rotational regions in accordance with the robot working data and taught turntable rotational position data stored for each of the divisional rotational regions and for causing the common controlling means to control the robot and turntable in accordance with the interpolated data.

1 Claim, 4 Drawing Sheets

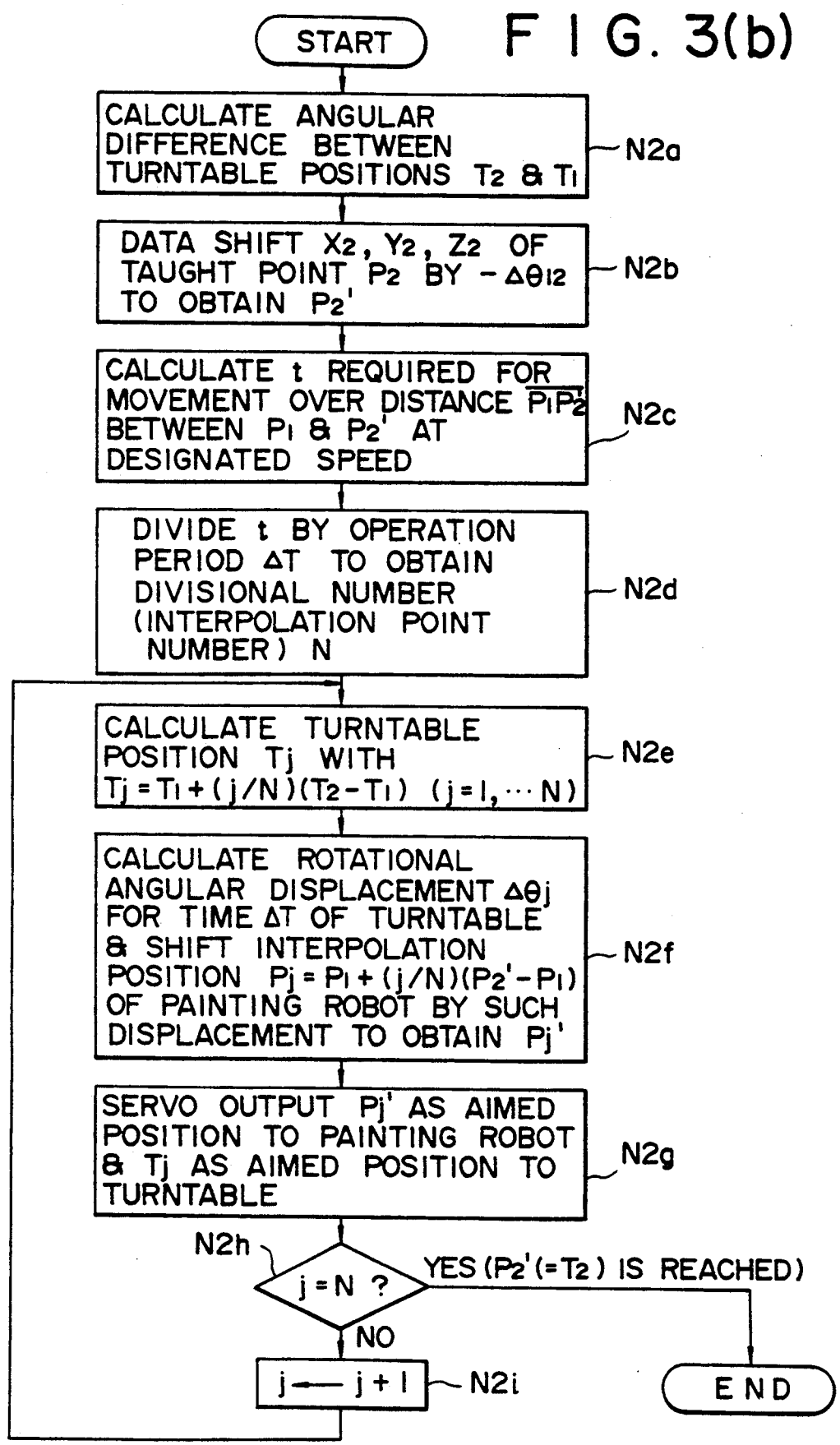

ROBOT TEACHING/PLAYBACK SYSTEM

BACKGROUND OF THE INVENTION

1. Field of the Invention

This invention relates to a robot teaching/playback system for carrying out various kinds of operation for a work carried on a rotating turntable, and more particularly to a robot teaching/playback system suitable for use, for example, with a painting robot or a welding robot.

2. Description of the Prior Art

When operation such as, for example, painting operation is carried out for various works of different profiles using a robot, it sometimes takes place that an arm of the robot does not come around a portion of the work depending upon a profile of the work. An improved painting system is conventionally known wherein a work is carried on and rotated by a turntable to a suitable position for operation in order to raise the degree of freedom in operation.

In such painting system which employs a turntable, when painting operation is carried out, for example, for a work having a rectangular shape in plan, where four vertical faces of the work are represented as A, B, C and D faces, the turntable is first stopped at a position at which the A face of the work is directed to the robot, and in this position, painting operation is carried out for the A face. After the painting operation is completed for the A face, the turntable is rotated subsequently until the B face of the work is directed to the robot. During such rotational movement, the robot stops its operation and waits. After the turntable is rotated to the position at which the B face of the work is directed to the robot, the turntable is stopped, and the robot carries out painting operation for the B face.

Thereafter, the step of rotating the turntable to a predetermined position (while the robots is held in its inoperative condition) and the step of carrying out painting operation for a face of the work which is directed to the robot after such turning movement are repeated alternatively to carry out painting operation for all of the vertical faces of the work.

With the conventional robot operating system, however, since operation of the robot is stopped during rotational movement of the turntable, the operating efficiency is low.

A system which is improved so as to have a higher operating efficiency has been proposed and is disclosed, for example, in Japanese Patent Laid-Open No. 195510/1989.

According to the improved system, a turntable and a robot are driven in a synchronized relationship, and also during rotation of the turntable, painting operation is carried out by the robot for a work carried on the turntable. The efficiency of painting operation is thus improved with the system.

In such system, however, a controlling apparatus for the turntable is normally provided separately from a controlling apparatus for the robot, and the turntable and robot are controlled so as to be driven in a synchronized relationship with each other while transmitting and receiving signals to and from the respective separate controlling apparatus.

Accordingly, when an operator effects operation, operation data of the robot must be taught such that it may be played back in a synchronized relationship with operation of the turntable while the operator individually operates the controlling apparatus. Accordingly, the system is disadvantageous in that very much time is required for the production of a program and accordingly the operability of the entire system is low.

SUMMARY OF THE INVENTION

It is an object of the present invention to provide a robot teaching/playback system which can control a robot to be operated also during turning movement of a turntable and is high in operability.

In order to attain the object, according to the present invention, there is provided a robot teaching/playback system which includes a turntable for rotating a work carried thereon and a robot for working the work carried on the turntable, comprising common controlling means for controlling the turntable and robot, teaching means for storing in a memory a set of "robot working data" and "taught turntable rotational position data" for each of divisional rotational regions into which the turntable is divided, and playback means for interpolating robot working data" and "turntable rotational position data" between each adjacent ones of the divisional rotational regions in accordance with the "robot working data" and "taught turntable rotational position data" stored for each of the divisional rotational regions and for causing the common controlling means to control the robot and turntable in accordance with the interpolation data.

With the robot teaching/playback system, the turntable and robot are controlled by the common controlling means. Accordingly, operation data can be taught regarding the turntable as an equivalent, for example, to one of articulations of the robot.

Then, upon working of the robot, playback operation is carried out not only in each of the divisional rotational regions but also between each adjacent ones of the divisional rotational regions. Consequently, such loss as may otherwise be provided by stopping of the robot during working is eliminated, and the operation efficiency is improved remarkably.

The above and other objects, features and advantages of the present invention will become apparent from the following description and the appended claims, taken in conjunction with the accompanying drawings.

A more complete appreciation of the invention and many of the attendant advantages thereof will be readily obtained as the same becomes better understood by reference to the following detailed description when considered in connection with the accompanying drawings, wherein:

BRIEF DESCRIPTION OF THE DRAWINGS

FIGS. 3a and 3b are flow charts illustrating a procedure of playback operation of the robot teaching/playback system of FIG. 1.

DETAILED DESCRIPTION OF THE PREFERRED EMBODIMENT

Figure 1:
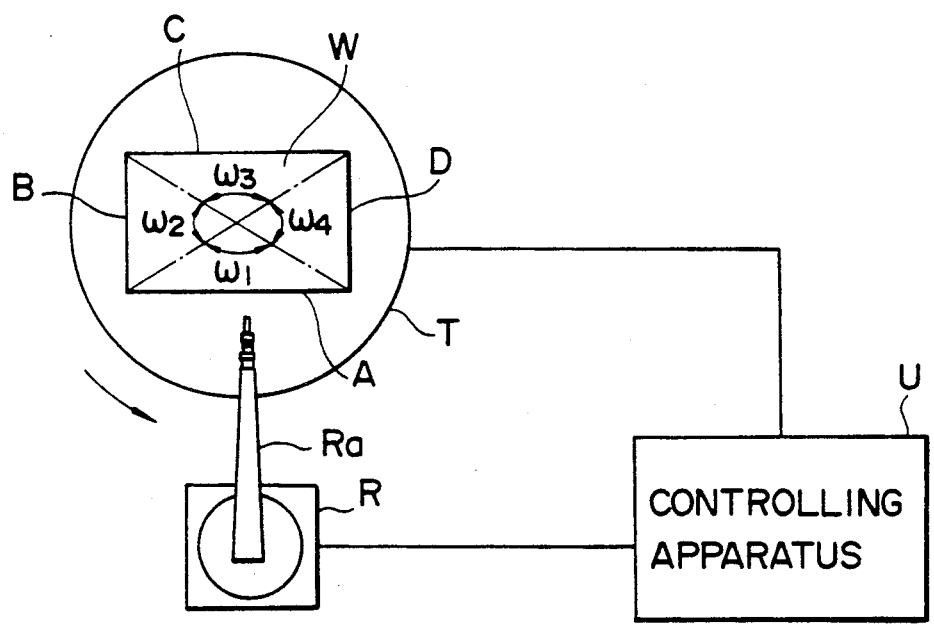
FIG. 1 is a diagrammatic representation of a robot teaching/playback system showing a preferred embodiment of the present invention.

Referring now to the drawings, wherein like reference numerals designate identical or corresponding parts throughout the several views, and more particularly to FIG. 1 thereof, there is shown a robot teaching/playback system to which the present invention is applied. In order to facilitate understanding of the embodiment, the present robot teaching/playback system of the embodiment is described as it is applied as a system which includes a painting robot for carrying out painting operation for a work of a parallelepiped having a rectangular shape in plan as seen in FIG. 1 while the present invention can naturally be applied to various robot teaching/playback systems for carrying out different operations such as, for example, welding, deburring and assembling operations for various works having different shapes.

The robot teaching/playback system includes, as principal hardware components, a turntable T which is rotated with a work W carried thereon, a robot R for carrying out painting operation for the work W carried on the turntable T, and a common controlling apparatus U for controlling the turntable T and robot R.

The robot R has an arm Ra which can be expanded and contracted toward and away from the work W carried on the turntable T in accordance with a profile of the work W. When works to be placed on the turntable T have such various sizes that a work placed on the turntable T may not be worked by operation of the arm Ra within an allowable operation range, the robot R should be placed on a trolley (not shown) so that the relative positions of the turntable T and robot R can be changed.

In this instance, operation data of the trolley are included in and processed together with operation data of movement of the arm Ra in the forward and backward directions.

With the controlling apparatus U described above, since the turntable T and robot R are controlled in such a manner as described above, operation data of the turntable T can be taught regarding the turntable T, for example, as an equivalent to one of articulations of the robot R.

In this connection, the origin is mechanically set in advance with regard to the turntable T, and it is processed for the determination in software by what degree or by what number of rotations the turntable T is rotated in the counterclockwise or clockwise direction around the origin. It is to be noted that, for example, a resolver or an encoder is used for the detection of a rotational position of the turntable T in this instance.

Meanwhile, with regard to a shape of the work W, it is assumed that, in order to simplify description thereof, it has a rectangular shape in plan as shown in FIG. 1 and painting operation is carried out for four vertical operating faces A, B, C and D of the work W in the order of A→B→C→D.

Figure 2:
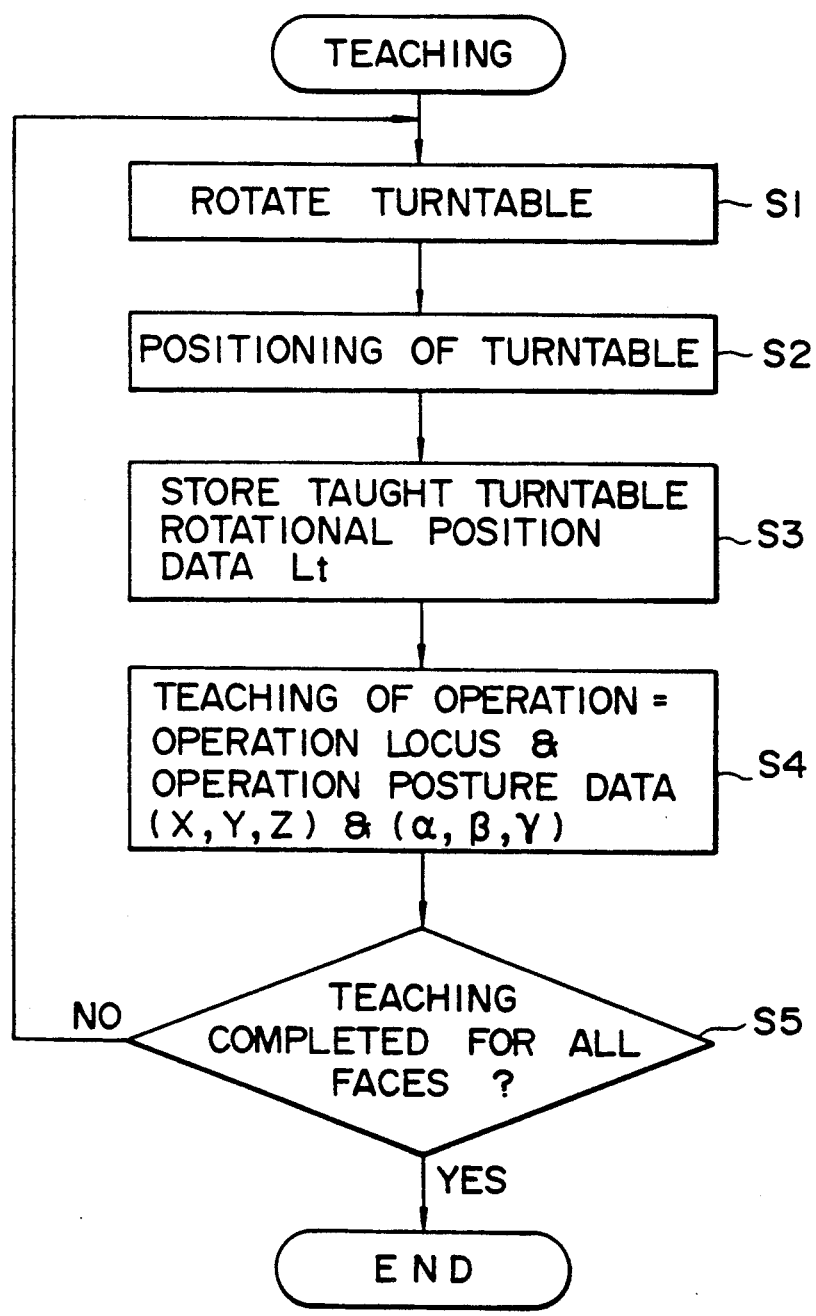
FIG. 2 is a flow chart illustrating a procedure of teaching operation of the robot teaching/playback system of FIG. 1.

Subsequently, a teaching procedure of painting operation for the work W will be described with reference to FIGS. 1 and 2.

In order to start teaching operation, an operator will first manually operate, at step S1, a control panel of the controlling apparatus U to turn the turntable T until the face A of the work W is directed accurately toward the robot R.

The A face of the work W belongs to one $\omega_1$ of four divisional rotational regions $\omega_1$, $\omega_2$, $\omega_3$ and $\omega_4$ into which a full rotational region of the turntable T is sectioned as seen in FIG. 1.

The step S1 described above may be omitted if the face A is directed accurately to the robot R from the beginning.

After it is detected at step S2 that the turntable T has been rotated to its predetermined initial position, taught turntable rotational position data Lt of the turntable T then are stored into a memory not shown of the controlling apparatus U at step S3.

Then, the robot R is rendered operative to teach painting operation for the A face of the work W. In this instance, normally so-called manual teaching which is carried out with conventional painting robots is carried out for the robot R. In particular, the operator will hold the arm Ra of the robot R with its hand and cause the robot R to make similar motion as in actual painting operation to teach the robot R. Similarly as in a conventional articulated robot, signals from encoders provided for individual arms and a wrist portion of the robot R are received and stored into the memory as an operation locus (X, Y, Z) of the cartesian coordinates system. Simultaneously, a posture of a tool, in this instance, a painting gun carried on the arm Ra of the robot R, that is, an operation posture ($\alpha$, $\beta$, $\gamma$), is stored. Accordingly, at step S4, six data of the operation locus (X, Y, Z) and the operation posture ($\alpha$, $\beta$, $\gamma$) are stored in pair, for convenience, together with the taught turntable rotational position data Lt described hereinabove.

After all teaching operation for the A face of the work W is completed, it is jedged at step S5 whether or not teaching operation for all of the vertical faces A, B, C and D has been completed.

At the present point of time, teaching operation for the B face of the work W corresponding to the second divisional rotational area $\omega_2$ must be carried out subsequently, and accordingly, the process returns to step S1.

After then, teaching is carried out successively for the B, C and D faces of the work W in a similar manner as in teaching for the A face.

Subsequently, playback operation of the robot teaching/playback system will be described with reference to the flow charts of FIGS. 3a and 3b.

Figure 3A:
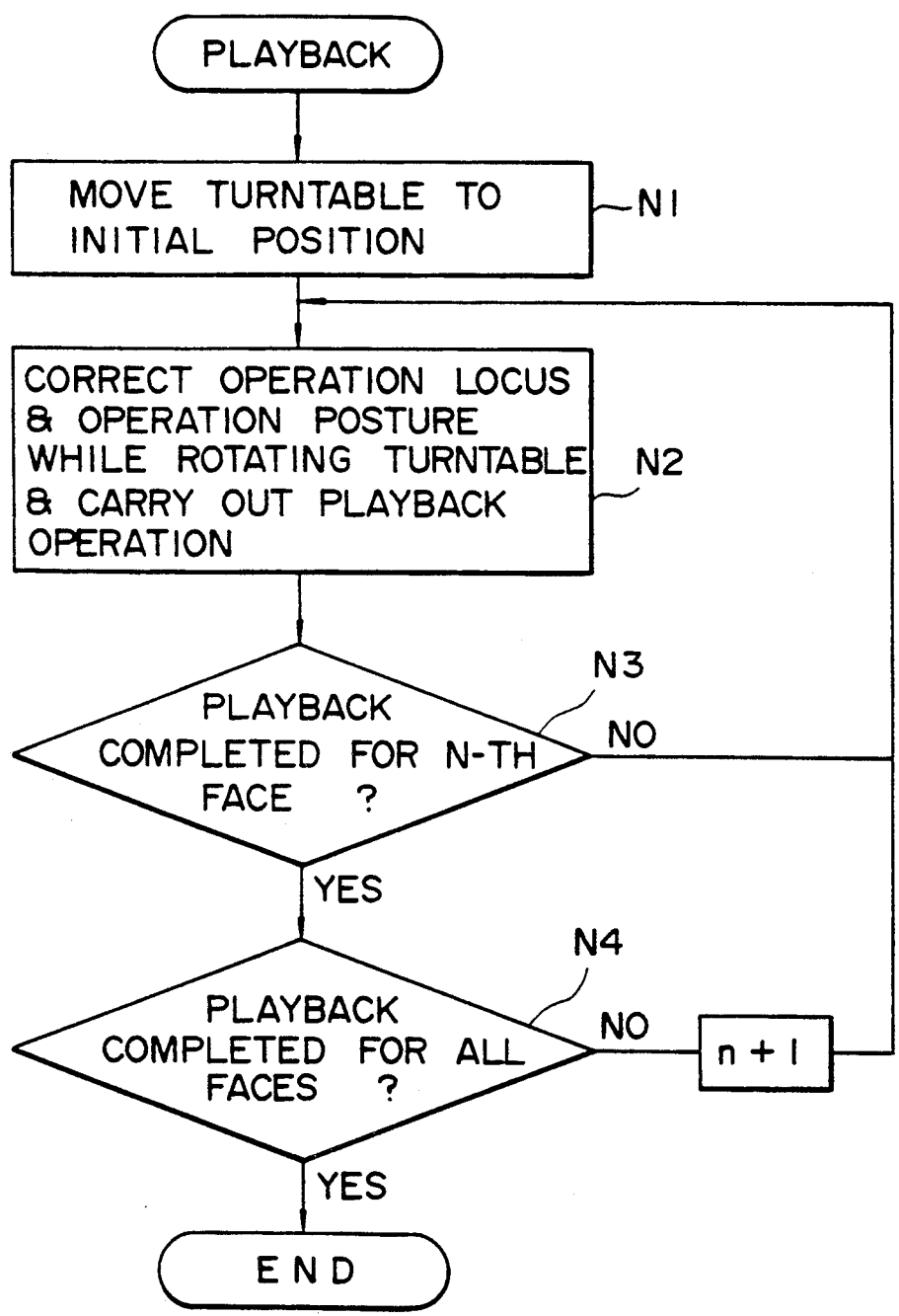

Referring first to FIG. 3a, after the robot teaching/playback system enters a playback mode, first at step N1, the robot R is returned to its initial position and the turntable T is rotated to the same position as the initial position thereof which was stored at step S3 of the teaching routine of FIG. 2 described hereinabove.

After the robot R and turntable T have been set to their individual initial positions in this manner, playback operation at step N2 is started.

Normally in a conventional painting robot, a speed of movement (a spraying speed) of an end of a painting gun is designated in such teaching operation described hereinabove. However, where the turntable T is added as a component as in the case of the system of the present embodiment, the moving speed of the end of the painting gun must necessarily be determined together with the speed of the turntable T so that a composite speed of the moving speeds of the individual arms and wrist of the robot R and the moving speed of the turntable T may be equal to the speed designated in the teaching operation described hereinabove. Accordingly, in the playback operation, such determination is achieved by correcting the operation locus (X, Y, Z) and the operation posture ($\alpha$, $\beta$, $\gamma$) obtained in the teaching operation for the A face of the work W in accordance with the taught turntable rotational position data Lt.

A procedure of producing a locus in this instance will be described with reference to FIG. 3b which illustrate details of contents of the step N2 of FIG. 3a.

Here, for example, two taught points $P_1$ ($X_1$, $Y_1$, $Z_1$, $\alpha_1$, $\beta_1$, $\gamma_1$, $T_1$) and $P_2$ ($X_2$, $Y_2$, $Z_2$, $\alpha_2$, $\beta_2$, $\gamma_2$, $T_2$) are presumed, where $T_1$ and $T_2$ denote successive rotational position data of the turntable T.

Thus, first at step N2a, an angular difference $\Delta\theta_{12}$ between the positions $T_2$ and $T_1$ of the turntable T is calculated. Then at step N2b, the position data ($X_2$, $Y_2$, $Z_2$) of the taught point $T_2$ are shifted by an amount equal to $-\Delta\theta_{12}$. In other words, the position data are converted into data at the position $T_1$ of the turntable T. The data thus obtained by the conversion are represented by $P_2'$.

Values of the data ($X_2'$, $Y_2'$, $Z_2'$) of the position $P_2'$ are given by the following expression:

$$\begin{bmatrix} X_2' \\ Y_2' \\ Z_2' \end{bmatrix} = \begin{bmatrix} X\theta \\ Y\theta \\ Z\theta \end{bmatrix} + \begin{bmatrix} \cos(-\Delta\theta_{12}) & -\sin(-\Delta\theta_{12}) & 0 \\ \sin\Delta\theta_{12} & \cos\Delta\theta_{12} & 0 \\ 0 & 0 & 1 \end{bmatrix} \cdot \begin{bmatrix} X_2 \\ Y_2 \\ Z_2 \end{bmatrix}$$

where (XO, YO, ZO) represent position data of the center of rotation of the turntable T.

Subsequently at step N2c, a time t is calculated which is required for the robot R to move over the distance between the taught points $P_1$ and $P_2'$ at the designated speed. In this instance, the distance between the taught points $P_1$ and $P_2'$ are given by the following expression:

$$\overline{P_1 P_2'} = \sqrt{(X_2' - X_1)^2 + (Y_2' - Y_1)^2 + (Z_2' - Z_1)^2}$$

Then at step N2d, a divisional number or interpolation point number N is calculated by dividing the time t calculated at step N2c by a calculation period $\Delta T$ of the controlling apparatus U. In this instance, the divisional number N described above corresponds to a number of interpolation data for robot operation data and taught turntable rotational position data between adjacent ones of the divisional rotational regions in the present system.

Subsequently at step N2e, a position $T_j$ of the turntable T corresponding to each interpolation position is calculated in accordance with the expression of $$T_j = T_1 + j/N(T_2 - T_1)$$

where j is a natural number from 1 to N.

Then at step N2f, a rotational angular displacement $\Delta\theta_j$ for a time of $\Delta T$ of the turntable T is calculated, and the interpolation position $P_j$ of the robot R is shifted by an amount equal to the displacement. The thus shifted value is represented by $P_j'$. In this instance, the position $P_j$ is given by $$P_j = P_1 + j/N(P_2' - P_1)$$

while the position $P_j'$ is given by the following expression:

$$\begin{bmatrix} X_j' \\ Y_j' \\ Z_j' \end{bmatrix} = \begin{bmatrix} X\theta \\ Y\theta \\ Z\theta \end{bmatrix} + \begin{bmatrix} \cos\Delta\theta_j & -\sin\Delta\theta_j & 0 \\ \sin\Delta\theta_j & \cos\Delta\theta_j & 0 \\ 0 & 0 & 1 \end{bmatrix} \cdot \begin{bmatrix} X_j \\ Y_j \\ Z_j \end{bmatrix}$$

where ($X_j'$, $Y_j'$, $Z_j'$) represent the position $P_j'$ while ($X_j$, $Y_j$, $Z_j$) represent the position $P_j$ described hereinabove.

After data for the interpolation positions have been calculated in such a manner as described above, the position $P_j'$ is servo outputted, at step N2g, as an aimed position to the robot R while the position $T_j$ is servo outputted as an aimed position to the turntable T.

The processing at steps N2e to N2g described above is repeated until it is judged at step N2h from the parameter j, which is incremented at step N2i, that data for all of the interpolation positions have been calculated.

In this instance, steps N2a to N2i interpolate "robot operation data" and "turntable rotational position data" between each adjacent ones of the divisional rotational regions in accordance with "robot operation data" and "taught turntable rotational position data" stored in memory for each divisional rotational region and cause the robot R and turntable T to carry out playback operation while rotating the turntable T in accordance with the interpolated data.

Referring back to FIG. 3a, after it is judged at step N3 that the playback operation, that is, the painting operation for the A face of the work W at the initial position has been completed in accordance with the data obtained in the procedure described above, it is judged at step N4 whether or not playback operation for all of the vertical faces of the work W has been completed. Here, at a point of time when playback operation for the A face is completed, the process returns to N2 because playback operation for the B face must subsequently be performed.

It is to be noted that, with the robot teaching/playback system, also between each adjacent ones of the divisional rotational regions, painting operation is continued while rotating the turntable T.

Playback operation is carried out successively for the succeeding B, C and D faces of the work W while rotating the turntable T in this manner.

Since the robot teaching/playback system according to the present embodiment is constituted in such a manner as described above, teaching operation can be carried out regarding the turntable T as one of the articulations of the robot R, and accordingly, the teaching operation can be performed readily and the number of teaching steps is reduced remarkably.

Further, in the present system, since working can be carried out by the robot R even during rotation of the turntable T, the operation efficiency in operation of the robot R is improved remarkably.

Further, also with regard to the cost, while the cost may be increased by some amount because a servomotor is employed in place of an invertor motor, total reduction in cost is achieved because a control panel for the turntable is eliminated and connecting wires are reduced.

Having now fully described the invention, it will be apparent to one of ordinary skill in the art that many changes and modifications can be made thereto without departing from the spirit and scope of the invention as set forth herein.

What is claimed as new and desired to be secured by Letters Patent of the United States is:

1. A robot teaching/playback system which includes a turntable for rotating a work carried thereon and a robot for working the work carried on said turntable, comprising:

common controlling means for controlling said turntable and robot;

teaching means for storing in a memory a set of robot working data and taught turntable rotational position data for each of divisional rotational regions into which said turntable is divided; and playback means for interpolating robot working data and turntable rotational position data between each adjacent ones of the divisional rotational regions in accordance with the robot working data and taught turntable rotational position data stored for each of the divisional rotational regions and for causing said common controlling means to control said robot and turntable in accordance with the interpolated data.

* * * * *